US007344908B2

United States Patent
Suh et al.

(10) Patent No.: US 7,344,908 B2
(45) Date of Patent: Mar. 18, 2008

(54) ATOMIC FORCE MICROSCOPE CANTILEVER INCLUDING FIELD EFFECT TRANSISTOR AND METHOD FOR MANUFACTURING THE SAME

(75) Inventors: Moon Suhk Suh, Gyeonggi-do (KR); Jin-Koog Shin, Seoul (KR); Churl Seung Lee, Gyeonggi-do (KR); Kyoung IL Lee, Seoul (KR)

(73) Assignee: Korea Electronics Technology Institute, Gyeonggi-do (KR)

( * ) Notice: Subject to any disclaimer, the term of this patent is extended or adjusted under 35 U.S.C. 154(b) by 0 days.

(21) Appl. No.: 11/614,489

(22) Filed: Dec. 21, 2006

(65) Prior Publication Data

US 2008/0016953 A1    Jan. 24, 2008

(30) Foreign Application Priority Data

Jul. 21, 2006    (KR)    ............... 10-2006-0068546

(51) Int. Cl.
   *H01L 21/00*    (2006.01)
(52) U.S. Cl. .............. 438/52; 438/50; 438/153; 438/154; 216/11; 216/12; 73/105; 73/862.53; 257/E21.176; 257/419
(58) Field of Classification Search ................ 438/52, 438/50, 153, 154; 257/419, E21.176; 216/11, 216/12; 73/105, 862.53
   See application file for complete search history.

(56) References Cited

U.S. PATENT DOCUMENTS 5,336,369 A * 8/1994 Kado et al. .............. 216/11
5,388,323 A * 2/1995 Hopson et al. .............. 29/595
5,595,942 A * 1/1997 Albrecht et al. .............. 438/52

FOREIGN PATENT DOCUMENTS

| KR | 2003-0012108 | 2/2003 |
|----|---|---|
| KR | 10-0466157 | 5/2003 |
| KR | 10-0466158 | 5/2003 |
| KR | 10-0555045 | 12/2004 |
| KR | 10-0515734 | 3/2005 |
| KR | 10-0515735 | 3/2005 |

(Continued)

OTHER PUBLICATIONS

English Language Abstract of KR 2003-0012108.

(Continued)

*Primary Examiner*—Michael Lebentritt
*Assistant Examiner*—Mohsen Ahmadi
(74) *Attorney, Agent, or Firm*—Greenblum & Bernstein, P.L.C.

(57) ABSTRACT

The present invention relates to an AFM (atomic force microscope) cantilever including a field effect transistor (FET) and a method for manufacturing the same; and, more particularly, to a method for manufacturing an AFM cantilever including an FET formed by a photolithography process, wherein an effective channel length of the FET is a nano-scale. Therefore, The present invention can easily implement a simulation for manufacturing the AFM cantilever including the FET by accurately controlling the effective channel length. And also, the present invention can manufacture the AFM cantilever including the FET having the effective channel ranging several tens to several hundreds nanometers by applying the low price photolithography device, thereby enhancing an accuracy and yield of the manufacturing process and drastically reducing process costs.

10 Claims, 7 Drawing Sheets

FOREIGN PATENT DOCUMENTS

KR  10-0558376  3/2005

OTHER PUBLICATIONS

English Language Abstract of KR 10-0466157.
English Language Abstract of KR 10-0466158.
English Language Abstract of KR 10-0515734.
English Language Abstract of KR 10-0555045.
English Language Abstract of KR 10-0558376.
English Language Abstract of KR 10-0515735.
U.S. Appl. No. 11/614,492 (Suh et al.), filed Dec. 21, 2006.

* cited by examiner

ATOMIC FORCE MICROSCOPE CANTILEVER INCLUDING FIELD EFFECT TRANSISTOR AND METHOD FOR MANUFACTURING THE SAME

BACKGROUND OF THE INVENTION

1. Field of the Invention

The present invention relates to an AFM (atomic force microscope) cantilever including a field effect transistor (FET) and a method for manufacturing the same; and, more particularly, to a method for manufacturing an AFM cantilever including an FET formed by a photolithography process, wherein an effective channel length of the FET is a nano-scale.

2. Background of the Related Art

A probe member of an AFM (atomic force microscope) has a sharp shape. Such probe member is formed in a sharp shape by wet etching or dry etching a general semiconductor substrate. The probe member formed through the wet etching becomes a pyramid shape and the prove member formed through a dry etching becomes a cone shape.

However, there is a very difficult problem in a manufacturing process that a conventional MOSFET (metal-oxide semiconductor field effect transistor) type device is mounted on the AFC cantilever.

Therefore, in order to solve such problem, a cantilever of which a FET structure is formed by a micro-machining method is recommended in Korea publication patent publication No. 2001-045981.

In a basic operation of a cantilever to form an FET (field effect transistor) by using a micro-machining method, after the cantilever formed thereon a source and a drain is vertically attached to a sample on which an insulation material is formed, a principle that an amount of current flowing into a drain according to a charge distribution of a sample surface is changed when a voltage is applied to the source is applied.

In Korea patent registration Nos. 0466157, 0466158, 0515734, 0555045 and 0558376, the cantilever is operated by forming a device channel on a sharp probe member, whereas in Korea patent registration No. 0515735, a high aspect-ratio based probe is constructed on the probe member at which a channel is formed.

However, in conventional techniques such as Korea patent registration Nos. 0466157, 0466158, 0515734, 0555045 and 0558376, the FET structure is formed through a process for forming the source/drain and the channel on the sharp probe member formed by a conventional process for manufacturing the AFM cantilever. There are a shortcoming that an error occurs during a process for reducing a width of the channel and a problem that a theoretical simulation cannot be performed for controlling an effective channel.

And also, in Korean patent registration No. 0515735 to form the high aspect ratio based probe on the probe member where the channel is formed, there is a problem that it is difficult to predict an effective length of the channel since a channel formation process is performed after forming the sharp probe member.

That is, since a technique of manufacturing a conventional FET AFM cantilever performs the channel formation process after forming the sharp probe member, the effective length of the channel cannot be measured finally. And also, there exist a problem that a high price electron beam lithography device is required for reducing a process error.

In this result, it causes many problems such as reduction of process yield and reliability and an increase of process costs or the like.

SUMMARY OF THE INVENTION

Technical Problem

It is, therefore, an object of the present invention to provide a method for manufacturing an AFM (atomic force microscope) cantilever including an FET (field effect transistor) of which a length of an effective channel is accurately controlled by applying a low price photolithography device.

It is another object of the present invention to provide a method for manufacturing an AFM cantilever including the FET which has an effective channel ranging below hundreds nanometers by using a photolithography device.

It is further another object of the present invention to provide a method capable of easily implementing a simulation for manufacturing an AFM cantilever including an FET.

It is still another object of the present invention to provide a method for forming a probe member of an AFM cantilever including an FET on which channels are easily formed with various shapes.

Technical Solution

In accordance with an aspect of the present invention, there is provided a method for manufacturing an AFM (atomic force microscope) cantilever including an FET (filed effect transistor), the method including the steps of: a first step of forming a multi-layer insulating layer on a top of a substrate where an inter-layer insulating layer and a second semiconductor substrate are sequentially formed on a top of a first semiconductor substrate; a second step of, after the multi-layer insulating layer is sequentially etched, forming a source/drain and a channel by injecting other type ions different from a type of the second semiconductor substrate; a third step of forming a probe and a probe member by etching the second semiconductor substrate; a fourth step of, after an insulating layer is formed on an area except for the probe and the probe member, forming a metal electrode on top surfaces of source/drain and channel regions, respectively; a fifth step of forming a cantilever member by sequentially etching the remaining multi-layer insulating layer, the second semiconductor substrate, the insulating layer and the first semiconductor substrate; and a sixth step of forming a handling member by etching a rear surface of the first semiconductor substrate.

It is preferable that the multi-layer insulating layer of the first step is formed by alternately depositing a silicon oxide layer and a silicon nitride layer.

It is preferable that an RTA (rapid thermal annealing) process is further performed between the second step and the third step.

In the method for manufacturing the AFM cantilever including the FET in accordance with an aspect of the present invention, the third step further includes the steps of: forming the insulating layer on a top surface of the second semiconductor substrate; forming a photoresist pattern for forming the probe and the probe member by performing a photolithography process; forming the probe and the probe member by etching the insulating layer and the second semiconductor substrate by using the photoresist layer pattern; releasing the probe by etching the inter-layer insulating layer existing at a bottom surface of the probe; and removing the photoresist layer pattern for forming the probe and the probe member.

In the method for manufacturing the AFM cantilever including the FET in accordance with an aspect of the present invention, the fourth step further includes the steps of: forming the photoresist layer pattern on an area except for a region where the metal electrode is formed by performing the photolithography process; depositing the metal electrode material; and forming the metal electrode on the top surfaces of the source/drain and the channel region by removing the photoresist pattern.

In the method for manufacturing the AFM cantilever including the FET in accordance with an aspect of the present invention, at the fifth step, the second semiconductor substrate, the inter-layer insulating layer and the first semiconductor substrate are etched in a thickness equal to a width of a cantilever.

In the method for manufacturing the AFM cantilever including the PET in accordance with an aspect of the present invention, the sixth step further includes the steps of: forming the photoresist passivation layer by coating the photoresist layer on a front and a rear surfaces of the first semiconductor substrate on a front and a rear surfaces of the first semiconductor substrate; forming a pattern of a handling member by patterning the photoresist passivation layer formed on the rear surface of the first semiconductor substrate; etching the first semiconductor substrate by using the pattern of the handling member; and removing the photoresist passivation layer existing at the front and the rear surfaces of the first semiconductor substrate.

In the method for manufacturing the AFM cantilever including the FET in accordance with an aspect of the present invention, the multi-layer insulating layer is etched by using a selective wet etching.

In accordance with another aspect of the present invention, there is provided an AFM (atomic force microscope) cantilever including an FET (field effect transistor), including: a handling member made of a semiconductor substrate; a cantilever member extendedly formed on a bottom surface of the handling member in a shape of a rod; a probe member extendedly formed on one side surface of the cantilever member and formed in a shape of a peak; and a probe formed on the peak of the probe unit to be in contact with a surface of an object to be analyzed, wherein the channel and the source/drain being in contact with the channel and made of a impurities different from a type of the semiconductor substrate are included in a bottom region of the probe.

In the method for manufacturing the AFM cantilever including the FET in accordance with an aspect of the present invention, the semiconductor substrate is a SOI (silicon-on-insulator) substrate or an SIMOX (separation by implanted oxygen) substrate.

DETAILED DESCRIPTION OF THE INVENTION

Above all, terms or words used in the specification and claims are not limited to usual or encyclopedical meaning, but the present invention should be understood by the meaning or concept matching to the technical spirits of the present invention on the basis of such principles that the scope of the term can be properly defined to explain the present invention with the best method by the inventor.

Accordingly, since the embodiments described in the present specification and construction described on the accompanying drawings are only the preferred embodiments, but do not represent for all technical aspects of the present invention, it should be understood that various equivalents and modification examples exist for replacing with the technical aspects of the present invention at the time of filing the present invention.

Hereinafter, a preferred embodiment of the present invention will be described in detail with reference to the accompanying drawings.

Figure 1:
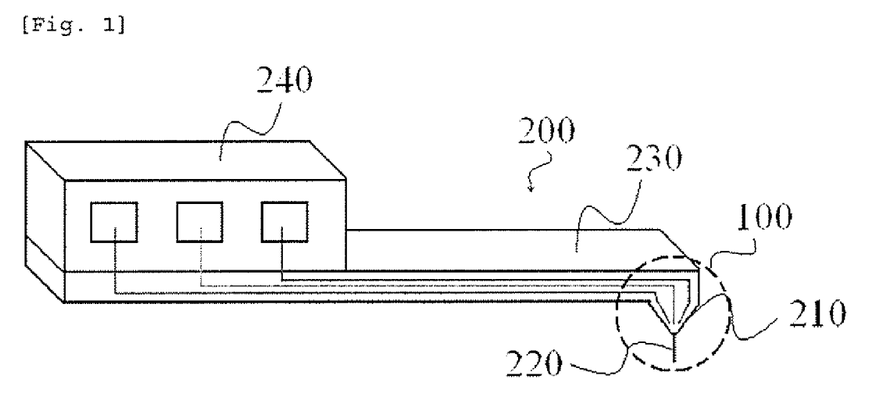
FIG. 1 is a perspective view showing an atomic force microscope (AFM) cantilever including a field effect transistor (FET) in accordance with an embodiment of the present invention.
Figure 2:
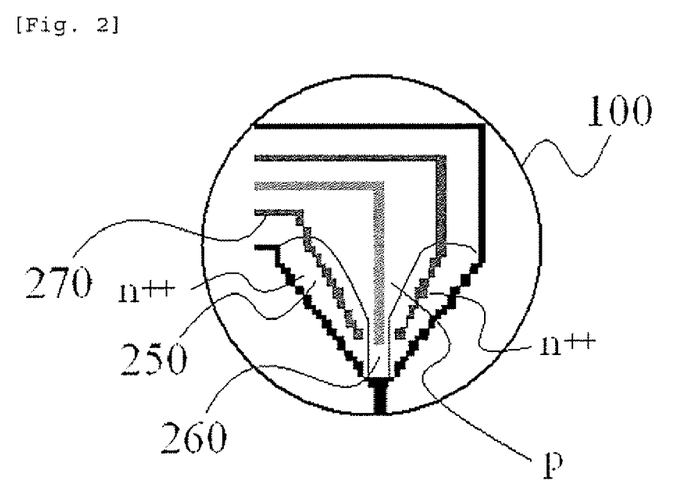
FIG. 2 is a cross-sectional diagram enlarging a probe and a probe member of FIG. 1.

In FIG. 1, there is shown a perspective view showing an AFM (atomic force microscope) cantilever 200 including an FET (field effect transistor) in accordance with an embodiment of the present invention. The AFM cantilever 200 in accordance with the embodiment of the present invention includes a handling member 240 made of a semiconductor substrate, a cantilever member 230 extendedly formed on a bottom surface of the handling member 240 in a shape of a rod, a probe member 220 made of a vertically protruded peak shape by being extendedly formed on one side surface of the cantilever member 230 and a probe 210 formed on a peak of the probe member 220 to be in contact with a surface of an object to be analyzed. The probe 210, the probe member 220, the cantilever member 230 and the handling member 240 are formed with extending from each side surface, and the probe member 220 and the probe 210 are formed on one side end of the cantilever member 230 in place of the center of the cantilever member 230 differently from the prior art. And also, in accordance with an enlarged view of a region 100 including the probe 210 and the probe member 220 as shown in FIG. 2, source/drain 250 are formed on both sides of the probe 210 and a channel region 260 is placed between the source/drain 250.

At this time, the source/drain 250 is a form which other type of impurities different from the channel region 260. It is preferable that the source/drain 250 is formed by N-type in case of the channel region 260 formed by P-type, and the channel region 260 is formed by the N-type in case of the source/drain 250 formed by the P-type.

Also, a metal electrode 270 is formed on the source/drain 250 and the channel region 260 respectively for an electrical connection.

Hereinafter, a manufacturing process of the AFM cantilever including the FET will be described in detail as follows with reference to the accompanying FIGS. 3a to 3m.

Figure 3A:
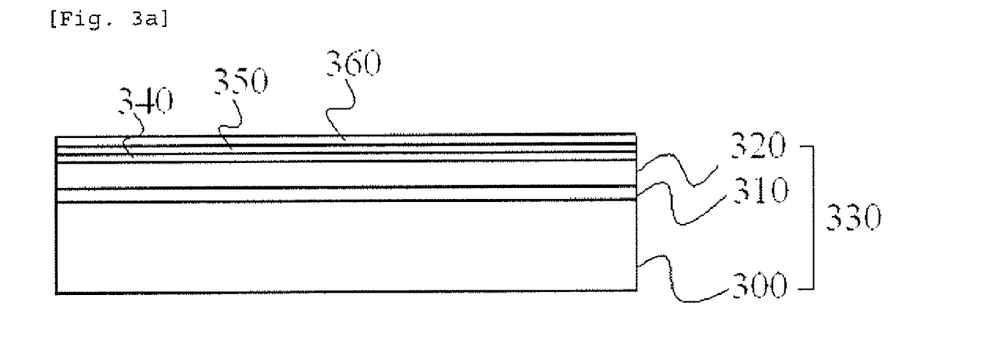
FIGS. 3a to 3m are manufacturing process diagrams of the AFM cantilever including the FET in accordance with the embodiment of the present invention.

At first, as shown in FIG. 3a, an inter-layer insulating layer 310 and a second semiconductor substrate 320 are formed on a top of a first semiconductor substrate 300 in consideration of a shape and a width of the probe member 220 to be formed as follows.

In the embodiment of the present invention, in place of formation processes of the first semiconductor substrate 300, the inter-layer insulating layer 310 and the second semiconductor substrate 320, the first semiconductor substrate 300 can be made of a single crystal bulk type silicon, the inter-layer insulating layer 310 can be made of a silicon oxide layer and the second semiconductor substrate 320 can be formed by applying an SOI (silicon-on-insulator) substrate made of poly crystal silicon or amorphous silicon or by applying an SIMOX (separation by implanted oxygen substrate).

At this time, the P-type (P-N-P transistor) structure or the N-type (N-P-N transistor) structure can be formed by applying an N-type or a P-type impurity doping to the second semiconductor substrate 320 composed of the poly crystal silicon or the amorphous silicon is formed as.

Thereafter, a multi-layer insulating layer is formed on a top of the second semiconductor substrate 320. The multi-layer insulating layer can be formed by alternately depositing a silicon oxide layer and a silicon nitride layer.

In one embodiment of the present invention, as shown in FIG. 3*a*, the multi-layer insulating layer composed of a first silicon oxide layer 340, a first silicon nitride layer 350 and a second silicon oxide layer is formed on a top of the second semiconductor substrate 320.

At this time, it is very important that the semiconductor substrates can be protected from a following process such as an etching process by forming the first silicon oxide layer 340 thick more than approximately 2.5 times in comparison with a thickness of the inter-layer insulating layer 310.

The first silicon oxide layer 340 is formed by using a chemical vapor deposition (hereinafter referring to as "CVD") or a thermal oxidation method, a first silicon nitride layer 350 is formed by a CVD, a low pressure chemical vapor deposition (hereinafter referring to as "LPCVD"), a plasma-enhanced chemical vapor deposition (hereinafter referring to as "PECVD"), and the second silicon oxide layer 350 is formed through a CVD process.

On the other hand, in case when the first silicon oxide layer 340 is formed through a thermal oxidation method, the first silicon oxide layer 340 can be formed on a top of the semiconductor substrate as well as a bottom of the semiconductor substrate; and, in case when the first silicon nitride layer 350 is formed by using an LPCVD, the first silicon nitride layer 350 can be formed on a bottom of the semiconductor substrate as described above.

If a formation process of the multi-layer insulating layer is finished, a formation process of an ion injection mask used in an ion injection process to form a source 400 and a drain 410 is performed.

Figure 3B:
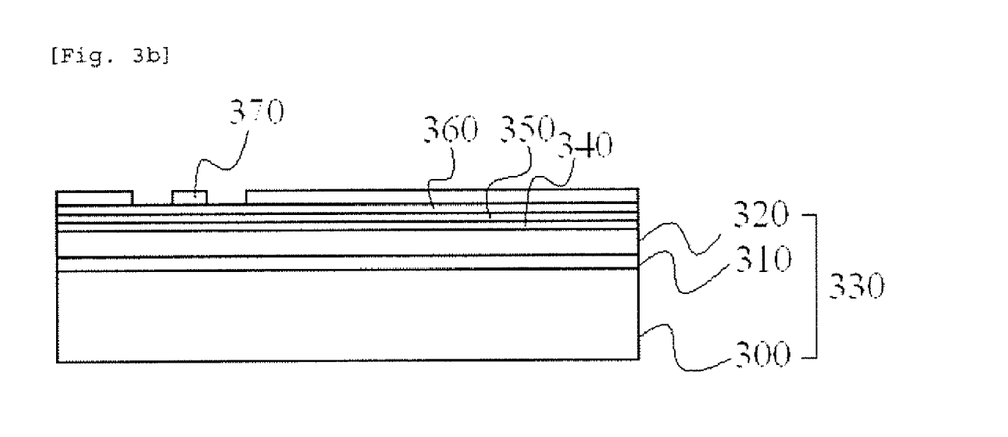

In order for the above, a photoresist layer is applied on an upper surface of the multi-layer insulating layer, and a formation process of a photoresist pattern 370 is performed to form the ion injection masks, as shown in FIG. 3*b*. It is preferable that the photoresist pattern is formed to expose regions for forming the source 400 and the drain 410.

After this, the multi-layer insulating layer existing at a bottom thereof is sequentially etched by using the photoresist layer pattern 370.

Figure 3C:
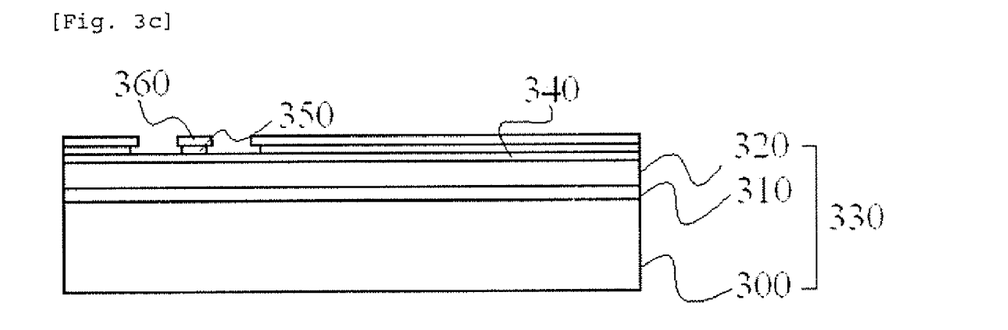

As shown in FIG. 3*c*, after the second silicon oxide layer 360 corresponding to the most upper layer of the multi-layer insulating layer is etched, a first silicon nitride layer 350 is etched.

At this time, the etching of the second silicon oxide layer 360 uses a solution obtained by mixing an ultra pure water and fluoride, or can apply a wet etching using a BHF (buffered HF) or a BOE (buffered oxide etchant) obtained by mixing $NH_4F$ and fluoride and can apply a dry etching using $CF_4$ gas, $CHF_3$ gas or the like which contains F. And, the first silicon nitride layer 350 is etched by a selective wet etching.

The first silicon nitride layer 350 etched as described above is etched until a portion of the bottom surface of the second silicon oxide layer 360 etched as shown in FIG. 3*c*.

The pattern of the etched first silicon nitride layer 350 is formed in a smaller shape than that of the second silicon oxide layer 360, as shown in FIG. 3*c*.

Figure 3D:
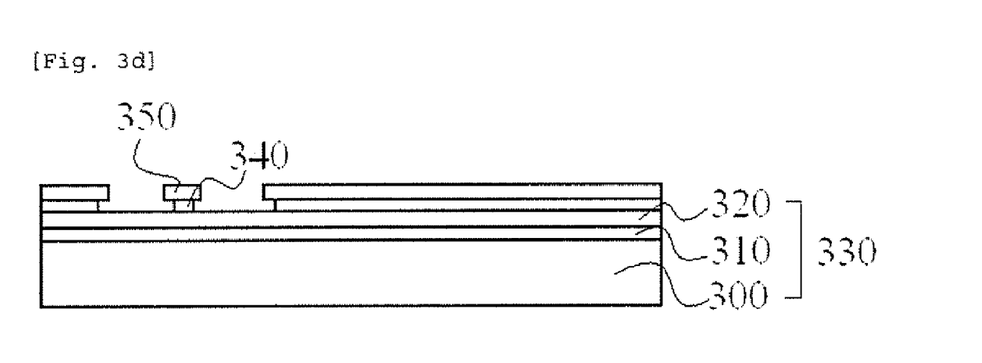

Thereafter, a pattern of the first silicon oxide layer 340 having a smaller size than the etched first silicon nitride layer 350 is formed by performing a wet etching or a selective wet etching to the first silicon oxide layer 340 by using the etched first silicon nitride layer 350 as an etching mask, as shown in FIG. 3*d*. At this time, the remaining second silicon oxide layer 360 is removed.

The above-described multi-layer insulating layer etching process causes the pattern to be reduced. That is, a width of an effective channel placed between the source 400 and the drain 410 can be formed with several tens to several hundreds nanometers by only using a photolithography process and an etching process.

Figure 3E:
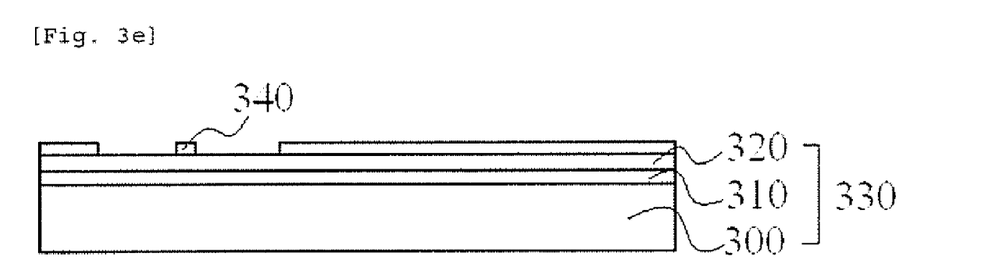

Thereafter, the first silicon nitride layer 350 is removed by the wet etching using phosphate ($H_3PO_4$), and formed as shown in FIG. 3*e*.

Figure 3F:
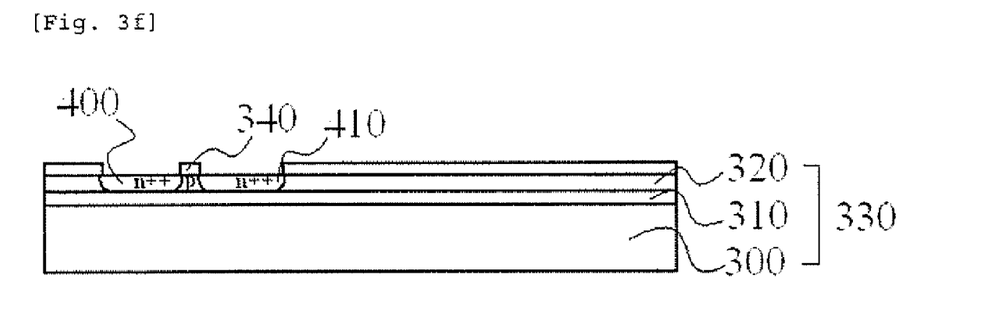

Thereafter, highly concentrated impurity ions are injected to form the source 400 and the drain 410.

The highly concentrated impurity ions are a type different from the second semiconductor substrate 320. For example, in case of the second semiconductor substrate 320 is the N-type, a highly concentrated the P-type impurity ions are injected, and in case of the second semiconductor substrate 320 is formed as P-type, highly concentrated N-type impurity ions are injected.

In the embodiment of the present invention, as shown in FIG. 3*f*, the second semiconductor substrate 320 is the P-type and the highly concentrated N-type impurity ions are injected.

Figure 3G:
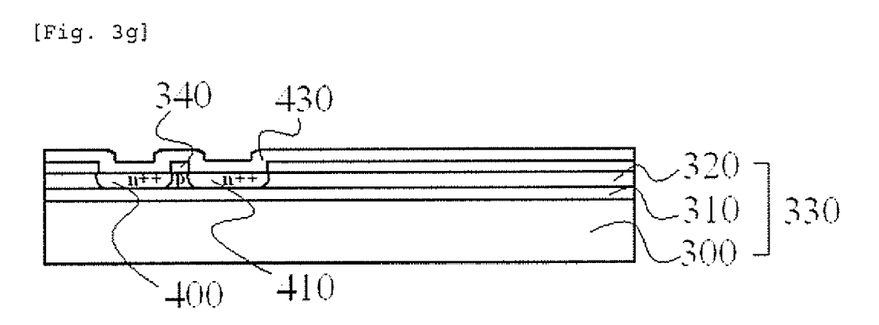

Thereafter, an annealing process is performed by using a device such as an RTA (rapid thermal annealing) device.

Figure 3H:
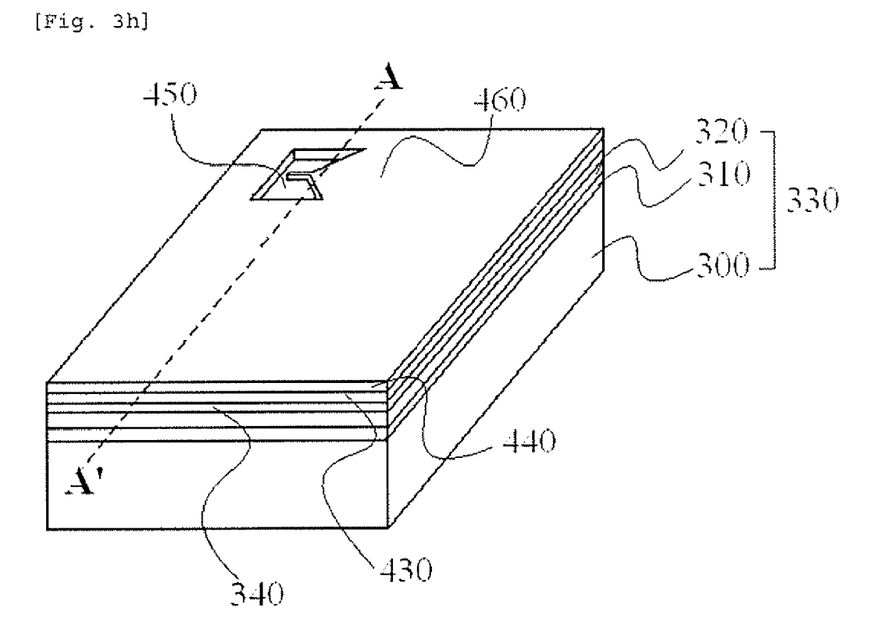

A third silicon oxide layer 430 is formed on a top of a substrate that an injection of the highly concentrated impurity ions are completed by using a chemical vapor deposition device, and the photoresist pattern 440 is formed by performing the photolithography process to form the probe member 210 and the probe 220, as shown in FIG. 3*h*.

In the embodiment of the present invention, a pattern exposing an area except for a region to form the probe member and the probe is formed by using a negative photoresist layer as the photoresist layer. Also, by forming the photoresist pattern capable of protecting an extra area being in contact with the region where the probe member is formed, a following process such as a formation process of the cantilever member becomes further easy.

At this time, the photoresist pattern 440 for forming the probe member and the probe can be made of various shapes. Therefore, it is possible to control a shape of the probe quite freely such as a probe formed vertically to a center of a probe member with a high aspect ration structure of several to several hundreds nanometer width, a probe bent from a center of a probe member 220*a* at a predetermined angle θ ranging from 12° to 20° with a high aspect ratio structure, and a probe formed with a structure protruded from both side surfaces. Therefore, the probe suitable for various fields of application can be manufactured without a limitation of process easily.

Figure 3I:
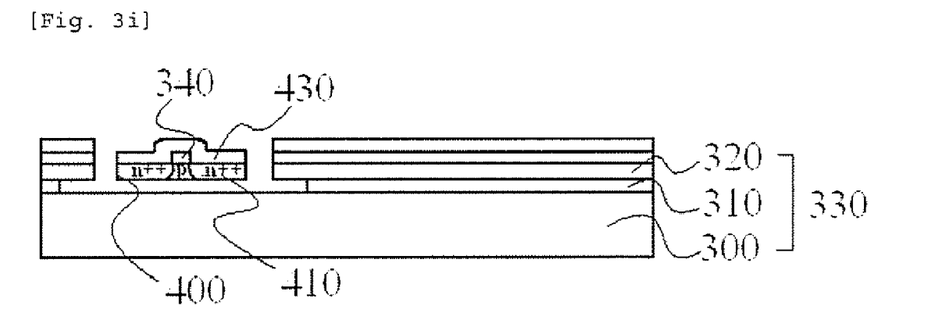

FIG. 3*i* represents a cross-section of FIG. 3*h* taken along a line A-A'. The third silicon oxide layer 430 is dry etched by using the photoresist pattern 440 to form the probe and probe member, and the second semiconductor substrate is etched, as shown in FIG. 3*i*.

At this time, an anisotropic etching is applied to the second semiconductor substrate by the dry etching, and the wet etching is performed for removing a part of the inter-layer insulating layer 310, as shown in FIG. 3i.

As the wet etching for removing the part of the inter-layer insulating layer 310 is applied for releasing the probe from the first semiconductor substrate, it makes the inter-layer insulating layer 310 placed on an end portion of the probe member adjacent to the probe to be completely removed, and the inter-layer insulating layer 310 placed on the remaining region to remain.

This can be easily controlled by adjusting a wet etching time.

And, the photoresist pattern 440 is removed by using a mixed solution including a sulphuric acid and hydrogen peroxide or oxygen plasma.

Figure 3J:
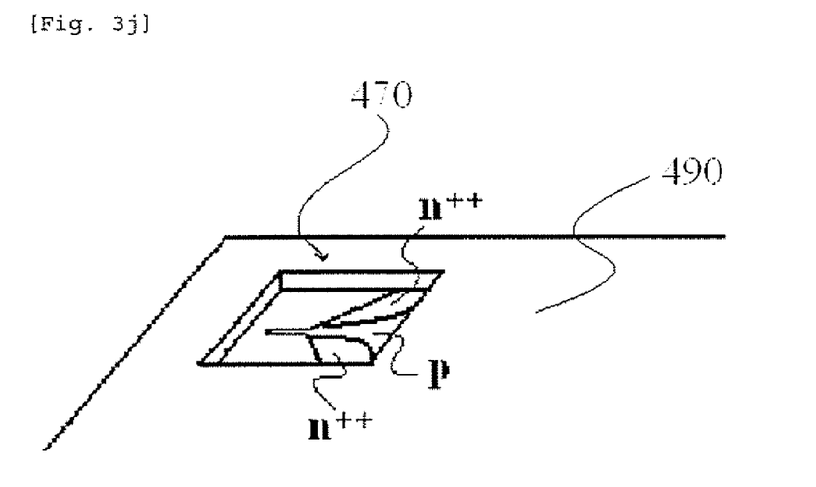

Thereafter, the photoresist pattern 490 is formed by performing the photolithography process again on an area except for a region 470 where a PN junction is formed, as shown in FIG. 3j.

The first silicon oxide layer 340 and the third silicon oxide layer 430 placed on the area 470 to be the PN junction is formed are removed by the wet etching process.

Figure 3K:
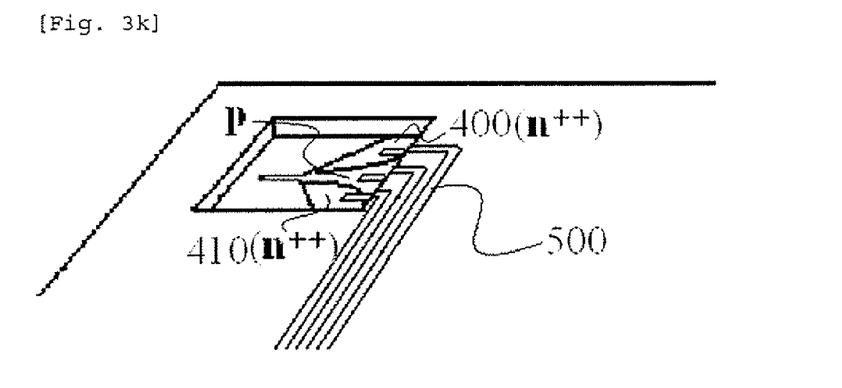

After removing the used photoresist pattern 490 by the wet or dry etching process, a plurality of electrodes 500 is formed on each of the source 400, the drain 410, and the channel 500, respectively, as shown in FIG. 3k.

The electrodes 500 are formed by a lift-off process. The formation of the electrodes 500 through the lift-off process is implemented depositing the metal material, the electrode material and removing the photoresist pattern 490, after the photoresist pattern is formed through the photolithography process on the area except for the region where the electrode 500 is formed.

At this time, the metal such as gold (Au) or platinum (Pt) is deposited as the electrode material and titanium (Ti) can be deposited to enhance adhesive force of the metal after depositing the gold (Au) or the platinum (Pt).

Through an above process, the probe and the probe member including the FET can be formed.

Figure 3L:
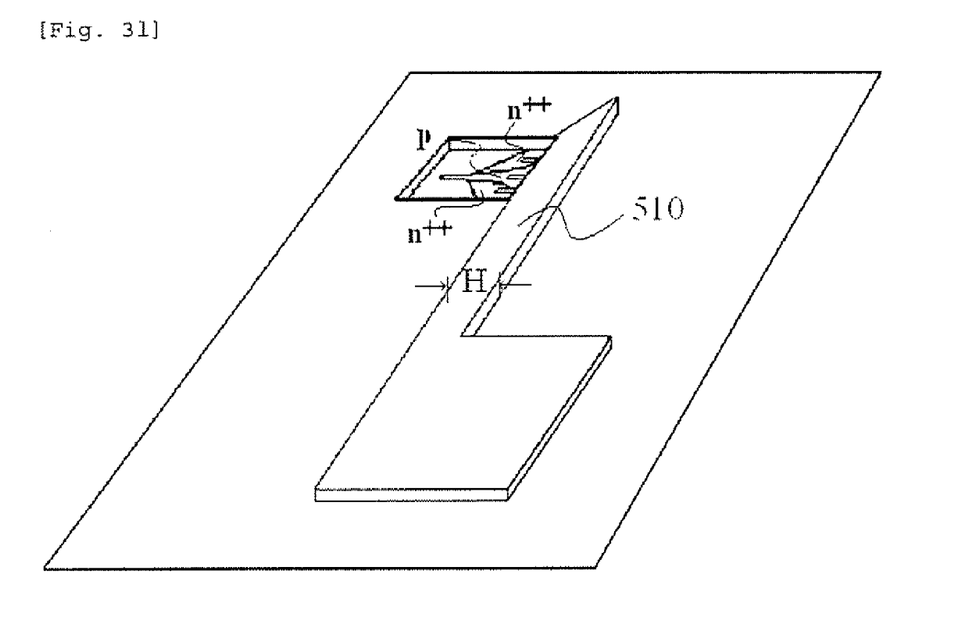

Thereafter, the photoresist pattern 510, as shown in FIG. 3l, is formed on an extra area being in contact with the region where the probe member is formed by performing the photolithography process to form the cantilever member, and the first silicon oxide layer and the third silicon oxide layer placed on the top surface of the second semiconductor substrate are removed by the dry etching process.

At this time, a width (H) of the cantilever can be easily determined during the formation of the photoresist pattern for forming the cantilever member.

Thereafter, the cantilever member is formed by the dry etching the second semiconductor substrate, the inter-layer insulating layer placed on a bottom surface thereof and the first semiconductor substrate. Since an etched depth (D) is determined by the width of the cantilever member, it is preferable that the etched depth is determined as similar as the width of the cantilever member.

After completing a formation process of the cantilever member, the remaining photoresist pattern 510 is removed by the dry or the wet etching, and the photoresist passivation layers are formed on a front and a rear surfaces of the substrate.

It is preferable that the photoresist passivation layer formed on the front surface of the substrate is formed thickly to protect the probe, the probe member and the cantilever member previously formed from the etching process performed during the formation process of the handling member.

The photoresist passivation layer formed on the rear surface of the substrate forms the photoresist pattern to form the handling member by performing the photolithography process.

Thereafter, the semiconductor substrate, i.e., the first semiconductor substrate is etched by a deep silicon etchant by using the formed photoresist pattern and it is etched until the photoresist passivation layer existing at the front surface of the substrate is exposed.

When the rear etching of the first semiconductor substrate is completed, all photoresist layers existing at the surface of the semiconductor substrate are removed.

Figure 3M:
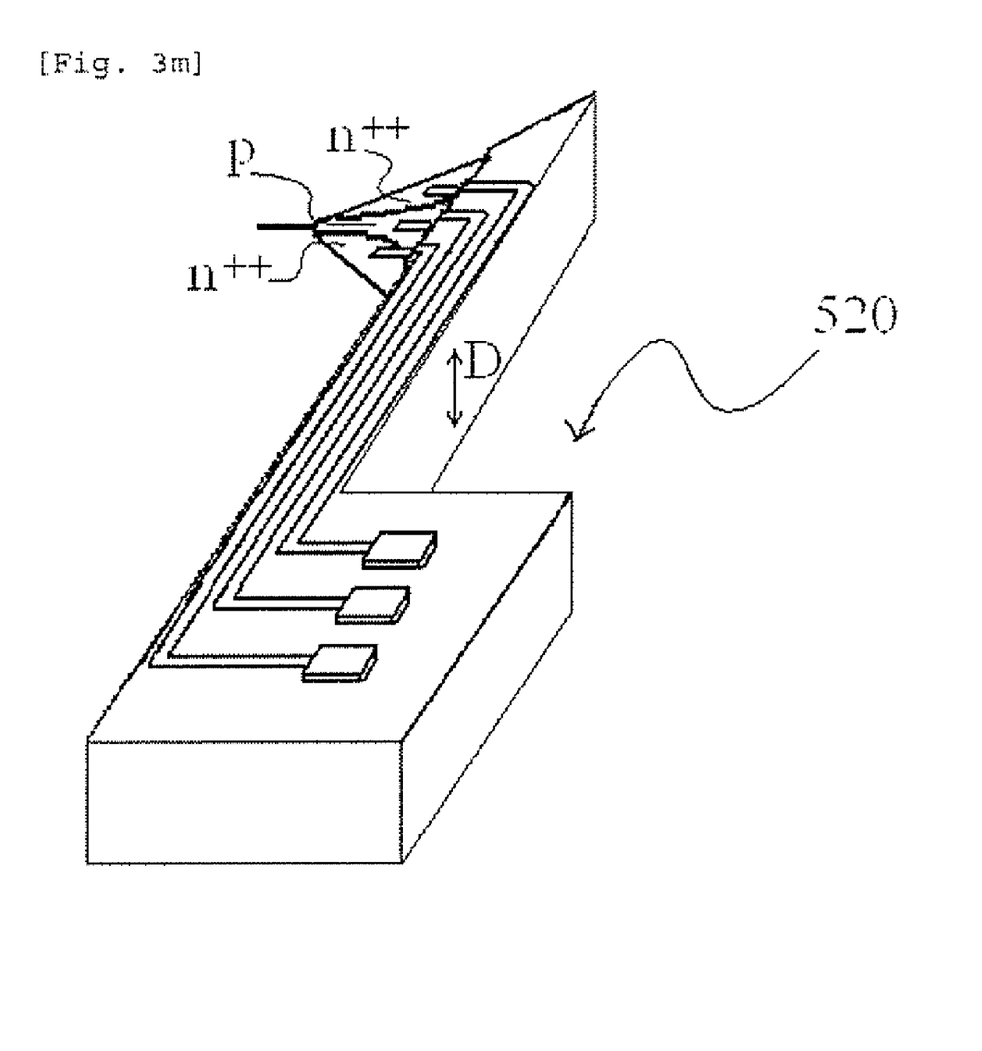

The AFM cantilever 520 finally released through a series of the processes can be obtained, as shown in FIG. 3m.

Therefore, the present invention can easily implement a simulation for manufacturing the AFM cantilever including the FET by accurately controlling the effective channel length and also can manufacture the AFM cantilever including the FET having the effective channel ranging from several tens to several hundreds nanometers by applying a low price photolithography device, thereby enhancing an accuracy and yield of the manufacturing process and drastically reducing process costs.

EFFECT OF THE INVENTION

The present invention can easily implement a simulation for manufacturing the AFM cantilever including the FET by accurately controlling the effective channel length.

And also, the present invention can manufacture the AFM cantilever including the FET having the effective channel ranging several tens to several hundreds nanometers by applying the low price photolithography device, thereby enhancing an accuracy and yield of the manufacturing process and drastically reducing process costs.

In addition, the present invention has an advantage of a wide range of application fields since the probe and the probe member of the AFM cantilever including the FET at which the channel is formed can be easily formed with various shapes.

While the present invention has been described with respect to certain preferred embodiments, it will be apparent to those skilled in the art that various changes and modifications may be made without departing from the scope of the invention as defined in the following claims.

What is claimed is:

1. A method for manufacturing an AFM (atomic force microscope) cantilever including an FET (filed effect transistor), the method comprising the steps of:
    a first step of forming a multi-layer insulating layer on a top of a substrate where an inter-layer insulating layer and a second semiconductor substrate are sequentially formed on a top of a first semiconductor substrate;
    a second step of, after the multi-layer insulating layer is sequentially etched, forming a source/drain and a channel by injecting other type ions different from a type of the second semiconductor substrate;
    a third step of forming a probe and a probe member by etching the second semiconductor substrate;
    a fourth step of, after an insulating layer is formed on an area except for the probe and the probe member, forming a metal electrode on top surfaces of source/drain and channel regions, respectively;
    a fifth step of forming a cantilever member by sequentially etching the remaining multi-layer insulating layer, the second semiconductor substrate, the insulating layer and the first semiconductor substrate; and a sixth step of forming a handling member by etching a rear surface of the first semiconductor substrate.

2. The method as recited in claim 1, wherein the multi-layer insulating layer of the first step is formed by alternately depositing a silicon oxide layer and a silicon nitride layer.

3. The method as recited in claim 2, wherein the multi-layer insulating layer is etched by using a selective wet etching.

4. The method as recited in claim 3, wherein the metal electrode material is deposited to enhance adhesive force after titanium (Ti) is deposited.

5. The method as recited in claim 1, between the second step and the third step, further comprising an RTA (rapid thermal annealing) process.

6. The method as recited in claim 1, wherein the third step further comprises the steps of:
forming the insulating layer on a top surface of the second semiconductor substrate;
forming a photoresist pattern for forming the probe and the probe member by performing a photolithography process;
forming the probe and the probe member by etching the insulating layer and the second semiconductor substrate by using the photoresist layer pattern;
releasing the probe by etching the inter-layer insulating layer existing at a bottom surface of the probe; and
removing the photoresist layer pattern for forming the probe and the probe member.

7. The method as recited in claim 1, wherein the fourth step further comprises the steps of:
forming the photoresist layer pattern on an area except for a region where the metal electrode is formed by performing the photolithography process;
depositing the metal electrode material; and
forming the metal electrode on the top surfaces of the source/drain and the channel region by removing the photoresist pattern.

8. The method as recited in claim 1, wherein, at the fifth step, the second semiconductor substrate, the inter-layer insulating layer and the first semiconductor substrate are etched in a thickness equal to a width of a cantilever.

9. The method as recited in claim 8, wherein the metal electrode substance is gold (Au) or platinum (Pt).

10. The method as recited in claim 1, wherein the sixth step further comprises the steps of:
forming the photoresist passivation layer by coating the photoresist layer on a front and a rear surfaces of the first semiconductor substrate on a front and a rear surfaces of the first semiconductor substrate;
forming a pattern of a handling member by patterning the photoresist passivation layer formed on the rear surface of the first semiconductor substrate;
etching the first semiconductor substrate by using the pattern of the handling member; and
removing the photoresist passivation layer existing at the front and the rear surfaces of the first semiconductor substrate.

* * * * *